July 19, 1932.  H. J. KUBIAK  1,868,328
BATTERY OVERCHARGE INDICATOR
Filed July 9, 1931
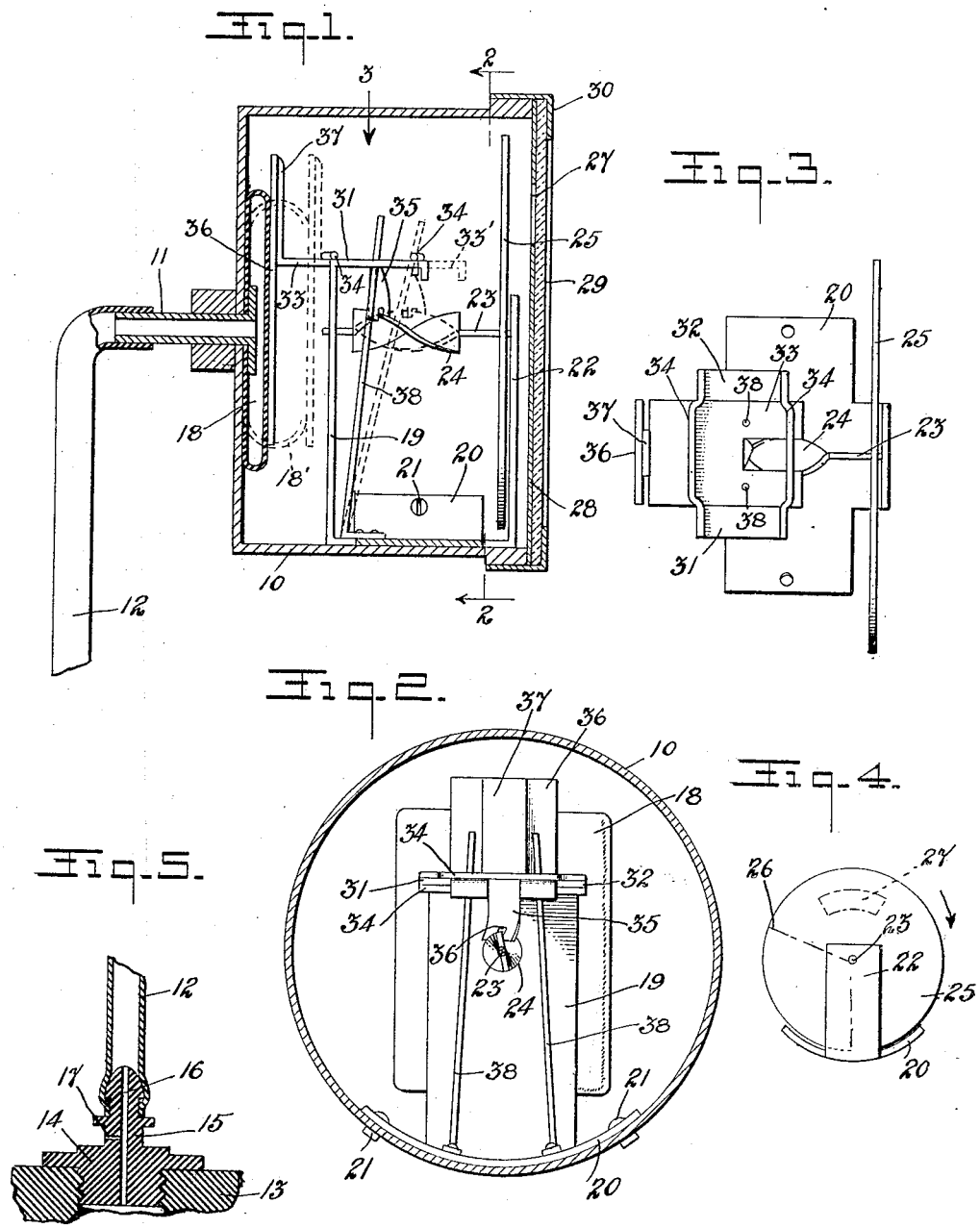
WITNESS:
INVENTOR
Henry J. Kubiak
BY
HIS ATTORNEY Patented July 19, 1932

1,868,328

UNITED STATES PATENT OFFICE

HENRY J. KUBIAK, OF MADISON, WISCONSIN

BATTERY OVERCHARGE INDICATOR

Application filed July 9, 1931. Serial No. 549,615.

This invention relates to battery overcharge indicators, and has for an object to provide improved means for indicating the overcharging of a secondary battery.

A further object of the invention is to provide means associated with a motor vehicle, or the like, having an indicator of improved type in view of the operator, with a communicating conduit from the battery to such indicator.

A further object of the invention is to provide a device including an expansible bag in direct communication with the battery, with mechanical devices operated by the expansible bag, indicating at different expansionable positions of the bag, different conditions of the battery.

The invention, therefore, comprises a disc journaled to move revolubly, and exhibiting through the proper sight opening different colors, with a spiral shaft controlling the disc, and an expansible bag in communication with the battery operating such controlling means.

The invention is directed to other objects, and possesses other features of novelty and advantage, some of which, together with the foregoing, will be hereinafter more fully set forth.

In the drawing:

Figure 1 is a vertical diametrical sectional view,

Figure 2 is a sectional view taken on line 2—2 of Figure 1,

Figure 3 is a top plan view of the mechanism as indicated by arrow 3 at Figure 1, Figure 4 is a view in front elevation of the indicating disc, and Figure 5 is a sectional view through the cap and nipple acting as a battery closure, and showing the bleeder.

Like characters of reference indicate corresponding parts throughout the several views.

The improved battery overcharge indicator, comprises a housing 10, shown here as cylindrical, but the form of the housing is immaterial. This housing is designed to be connected and supported upon or from the dash, instrument board, or other visible parts of a motor vehicle when used in association with such vehicle. The housing is provided with a nipple 11 which communicates through a flexible tube 12, with a battery 13 conveniently placed. One or more of the cells of the battery has a modified type of cap 14, having a nipple 15 thereon connected with the flexible tube 12. The nipple has a canal 16 therethrough providing passage from the battery cell to the tube 12, and a bleeder 17 communicating with the atmosphere.

The nipple 11 forms communication through one wall of the housing 10, and communicates with the flexible bag 18 so that any excess pressure within the battery 13 is communicated to the bag to expand the bag to the position 18′.

Within the housing 10, an upright 19 is erected, supported upon a base member 20 by means of which the device is secured rigidly within the housing, as by the bolts or rivets 21. A second upright 22 is spaced away from the upright 19, and together, the uprights serve to journal a shaft 23. This shaft 23 is provided with a spiral shaft 24 and carries the disc 25 which is provided upon its face with segments of different colors, such different colors being shown at Figure 4 as separated by the dotted lines 26. The disc, and of course the segments of the disc, are visible through the sight opening 27 formed in the cover 28 which in turn, is enclosed by a crystal 29 held by a bezel 30.

The upright 19 is provided with a right angle bend bifurcated to form the sections 31 and 32. A bar 33 is mounted to slide between the bifurcated sections 31 and 32 and guides for positioning the bar are provided, here shown specifically as wire loops 34. The bar 33 has a downwardly extending finger 35, bifurcated at its lower end as shown at 36 to embrace the upper edge of the spiral shaft 24 so that as the bar 33 and finger 35 are moved, as indicated at Figure 1, to dotted line position 33', the finger 35, traveling along the margin of the spiral shaft turns the disc in the direction indicated by the arrow at Figure 4.

The bar 33 is provided with a plate 36 which bears against the bag 18, such connection being preferably, though not necessarily, by a right angle return bend 37 integral both with the bar 33 and the plate 36. For retracting the bar 33 and associated parts from the dotted line position, as above described, springs are provided, here shown specifically as the straight wire springs 38, it being obvious however, that other types of springs may be substituted.

In operation with the battery functioning normally, the parts will be associated as shown in full lines at Figure 1. When excess pressure is developed in the battery by reason of overcharging, such pressure is communicated through the tube 12 to the bag 18, expanding the bag to dotted line position 18', moving the plate 36 and bar 33 also to dotted line positions against the tension of the springs 38. The sliding movement of this bar 33, and the finger 35 carried thereby, moves the disc 25 revolubly in the direction indicated by the arrow at Figure 4, thereby displaying through the sight opening a segment of the disc colored differently from the segments normally displayed so that the operator, by noticing the color displayed, will take warning of overcharging.

It is obvious that pressure once generated within the battery cell and communicated to the bag 18 might be retained beyond the point where overcharging has been discontinued. So that the parts will return to normal when the overcharging has ceased to generate gases, the bleeder 17 is provided. While this bleeder is shown as formed in the nipple at Figure 5, it is obvious that it may be otherwise accommodated with the battery cap, and even with the battery cell aside from the cap.

Of course, the battery overcharge indicator, herein illustrated, may be modified in various ways without departing from the invention herein set forth and hereinafter claimed.

The invention is hereby claimed as follows:

1. A battery overcharge indicator comprising in combination with a secondary battery cell, an indicating organization, a conduit from the battery to said organization, and means inherent in the organization operatively affected by pressure within the conduit, said conduit being provided with a bleeder interposed between said organization and cell.

2. A battery overcharge indicator comprising in combination with a secondary battery cell, an indicating organization including an arcuately movable index, a conduit from the battery to said organization, and means inherent in the organization operatively affected by pressure within the conduit to move the index, said conduit being provided with a bleeder interposed between said organization and cell.

In testimony whereof I have signed my name to this specification.

HENRY J. KUBIAK.